United States Patent
Wang et al.

(10) Patent No.: US 8,896,798 B2
(45) Date of Patent: Nov. 25, 2014

(54) LIQUID CRYSTAL DISPLAY AND MANUFACTURING METHOD FOR THE SAME

(75) Inventors: JinJie Wang, Shenzhen (CN); Chenghung Chen, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 304 days.

(21) Appl. No.: 13/380,038

(22) PCT Filed: Oct. 21, 2011

(86) PCT No.: PCT/CN2011/081126
§ 371 (c)(1),
(2), (4) Date: Dec. 22, 2011

(87) PCT Pub. No.: WO2013/056468
PCT Pub. Date: Apr. 25, 2013

(65) Prior Publication Data
US 2013/0100391 A1    Apr. 25, 2013

(30) Foreign Application Priority Data
Oct. 20, 2011   (CN) .......................... 2011 1 0321030

(51) Int. Cl.
*G02F 1/1345*   (2006.01)

(52) U.S. Cl.
CPC ........ *G02F 1/13458* (2013.01); *G02F 1/13452* (2013.01)
USPC .......................................................... 349/150

(58) Field of Classification Search
CPC ......................... G02F 1/13458; G02F 1/13452
USPC .................................................. 349/149–152
See application file for complete search history.

(56) References Cited

U.S. PATENT DOCUMENTS

| | | | |
|---|---|---|---|
| 8,300,200 B2* | 10/2012 | Jheng | 349/152 |
| 2003/0146990 A1* | 8/2003 | Tsukamoto et al. | 348/294 |
| 2008/0013029 A1* | 1/2008 | Kim | 349/150 |
| 2009/0147204 A1* | 6/2009 | Kang | 349/150 |

* cited by examiner

*Primary Examiner* — Thanh-Nhan P Nguyen

(57) ABSTRACT

The present invention provides a design of a bonding pad of a LCD panel and a flexible printed circuit (FPC). Each bonding pad is divided into three sections. Therefore, more bonding pads can be disposed on a high resolution panel without reducing total bonding width. Furthermore, the bonding pad with three sections, the FPC bonding pad and the panel bonding pad which are coupled with each other have different area so that misalignment is avoided in the process of bonding of the FPC and panel bonding pad. Besides that, a bonding area of each FPC bonding pad and panel bonding pad are substantially the same to assure resistance.

6 Claims, 10 Drawing Sheets

LIQUID CRYSTAL DISPLAY AND MANUFACTURING METHOD FOR THE SAME

BACKGROUND OF THE INVENTION

1. Field of the Invention

The present invention relates to a liquid crystal display (LCD) device, and more particularly, to a LCD device having a design of a bonding pad between a LCD panel and a flexible printed circuit.

2. Description of the Prior Art

Owing to their low-profile, thin, and lightweight features, LCD devices have replaced cathode ray tubes (CRTs) in many applications and becomes the mainstream display devices in recent years. LCD panels are widely used in electronic devices such as mobile phones, personal digital assistants (PDAs), digital cameras, computer screens, notebook screens, etc.

A conventional liquid crystal display (LCD) device comprises a LCD panel and external driving chips. The external driving chips transmit scan or data signals to pixels of the LCD panel to display images via metallic wires on the LCD panel.

The external driving chips and the LCD panel are coupled through a flexible printed circuit (FPC) on which metallic wires are set up. One end of each metallic wire on the FPC is coupled to output of the external driving chips, and the other end of each metallic wire on the FPC is coupled to each metallic wire of the LCD panel. Due to the arrangement, the driving chips can output signals to the LCD panel successfully.

In addition, the metallic wires of the FPC are bonded to the metallic wires of the LCD panel. In the prior art, there is a convex FPC bonding pad at the end of each metallic wire on the FPC, and there is also a convex panel bonding pad at the end of each metallic wire on the LCD panel. In the process of bonding, anisotropic conductive film (ACF) is coated on the surface of the LCD panel. Then the FPC bonding pads target at and stick to the panel bonding pads. Conductive particles in the ACF are crushed by pressing and heating, so that the FPC bonding pads couples the panel bonding pads.

Please refer to FIG. 1. FIG. 1 is a local diagram of a LCD device 100 in the prior art. To facilitate the description, FIG. 1 only shows bonding areas of the FPC and the LCD panel. The panel bonding pad 110 is designed as one section. Every bonding pad 110 has the same area. All pitches between any two neighboring bonding pads 110 are identical. The FPC bonding pad 120 is also designed correspondingly to the panel bonding pad 110 for bonding.

Owing to panel resolution being getting higher, more data lines are needed to be disposed on the LCD panel. Hence it is necessary to set up more bonding pads. The measure of bonding area, however, is actually limited. Therefore, the solution is to reduce the areas of the bonding pad/FPC bonding pad and to reduce a pitch between two neighboring panel bonding pads and between two neighboring FPC bonding pad. But it is ineffective to mass production because machine precision leads to misalignment of the panel bonding pad and FPC bonding pad of probably the to cause abnormal signal transmission.

SUMMARY OF THE INVENTION

Accordingly, the present invention proposes a design of a bonding pad of a LCD panel and a flexible printed circuit (FPC). Each bonding pad is divided into three sections. Therefore, more bonding pads can be disposed on a high resolution panel without reducing total bonding width. Furthermore, the bonding pad with three sections, the FPC bonding pad and the panel bonding pad which are coupled with each other have different area so that misalignment is avoided in the process of bonding of the FPC and panel bonding pad.

According to the present invention, a liquid crystal display (LCD) panel comprising a glass substrate, a plurality of metallic wires and a plurality of panel bonding pads. Each metallic wire is coupled to one of the plurality of panel bonding pads. The plurality of panel bonding pads further comprise: a first set of panel bonding pads placed in a first section; a second set of panel bonding pads placed in a second section; and a third set of panel bonding pads placed in a third section. Each area of the first set of panel bonding pads is different from that of the second set of panel bonding pads.

In one aspect of the present invention, each area of the first set of panel bonding pads is smaller than that of the second set of panel bonding pads, and each area of the second set of panel bonding pads equals to that of the third set of panel bonding pads.

In one aspect of the present invention, a distance from the pixel area of the LCD panel to the second section is closer than that from the pixel area of the LCD panel to the first section.

In one aspect of the present invention, each panel bonding pad comprises: a first metallic layer, formed on the glass substrate, for coupling to one of the metallic wires; an insulating layer, formed on the first metallic layer; a second metallic layer, formed on the insulating layer; a passivation layer, formed on the second metallic layer; and a transparent conducting layer, formed on the passivation layer, for electrically connecting to a first metallic layer and a second metallic layer through a via defined on the passivation layer and the insulating layer.

According to the present invention, a flexible circuit board comprises a substrate, a plurality of metallic wires and a plurality of FPC bonding pads. Each of the metallic wires is coupled to one of the FPC bonding pads. The plurality of FPC bonding pads further comprise: a first set of FPC bonding pads placed in a first section; a second set of FPC bonding pads placed in a second section; and a third set of FPC bonding pads placed in a third section. Each area of the first set of FPC bonding pads is different from that of the second set of FPC bonding pads.

In one aspect of the present invention, each area of the first set of FPC bonding pads is greater than that of the second set of FPC bonding pads, and each area of the second set of FPC bonding pads equals to that of the third set of FPC bonding pads.

In one aspect of the present invention, the FPC is used for coupling a LCD panel to a driving chip, and a distance from the second section to a pixel area of the LCD panel is closer than that from the first section to the pixel area of the LCD panel after the FPC is coupled to the LCD panel.

According to the present invention, a liquid crystal display (LCD) device comprising an LCD panel and a flexible circuit board for linking the LCD panel and an external driving chip. The LCD device further comprises: a glass substrate, a plurality of first metallic wires formed on the glass substrate, and a plurality of panel bonding pads. Each panel bonding pad is coupled to one of the plurality of first metallic wires. The plurality of panel bonding pads further comprises a first set of panel bonding pads placed in a first section; a second set of panel bonding pads placed in a second section; and a third set of panel bonding pads placed in a third section. The flexible printed circuit comprises a substrate, a plurality of second metallic wires formed on the substrate, and a plurality of FPC bonding pads. Each FPC bonding pad is coupled to one of the plurality of second metallic wires. The plurality of FPC bonding pads comprise a first set of FPC bonding pads placed in a fourth section, a second set of FPC bonding pads placed in a fifth section, and a third set of FPC bonding pads placed in a sixth section. Each area of the first set of panel bonding pads is different from that of the second set of panel bonding pads. The first section corresponds to the fourth section, the second section corresponds to the fifth section, and the third section corresponds to the sixth section when the flexible circuit board couples to the LCD panel.

In one aspect of the present invention, each area of the first set of panel bonding pads is smaller than that of the second set of panel bonding pads, and each area of the second set of panel bonding pads equals to that of the third set of panel bonding pads.

In one aspect of the present invention, a distance from the pixel area of the LCD panel to the second section is closer than that from the pixel area of the LCD panel to the first section.

In one aspect of the present invention, each panel bonding pad comprises a first metallic layer, formed on the glass substrate, for coupling to one of the first metallic wires, an insulating layer, formed on the first metallic layer, a second metallic layer formed on the insulating layer, a passivation layer, formed on the second metallic layer, and a transparent conducting layer, formed on the passivation layer, for electrically connecting to a first metallic layer and a second metallic layer through a via defined on the passivation layer and the insulating layer.

In one aspect of the present invention, each area of the first set of FPC bonding pads is greater than that of the second set of FPC bonding pads, and each area of the second set of FPC bonding pads equals to that of the third set of FPC bonding pads.

In one aspect of the present invention, each area of the second set of panel bonding pads is identical with each area of the first set of FPC bonding pads.

In one aspect of the present invention, each area of the first set of panel bonding pads is identical with each area of the second set of FPC bonding pads.

In one aspect of the present invention, each area of the plurality of panel bonding pads is identical with each area of the plurality of FPC bonding pads.

Compared to the prior art, the present invention provides a design of a bonding pad of a LCD panel and a flexible printed circuit (FPC). Each bonding pad is divided into three sections. Therefore, more bonding pads can be disposed on a high resolution panel without reducing total bonding width. Furthermore, the bonding pad with three sections, the FPC bonding pad and the panel bonding pad which are coupled with each other have different area so that misalignment is avoided in the process of bonding of the FPC and panel bonding pad. Besides that, a bonding area of each FPC bonding pad and panel bonding pad are substantially the same to assure resistance.

These and other features, aspects and advantages of the present disclosure will become understood with reference to the following description, appended claims and accompanying figures.

DETAILED DESCRIPTION OF THE PREFERRED EMBODIMENTS

Figure 1:
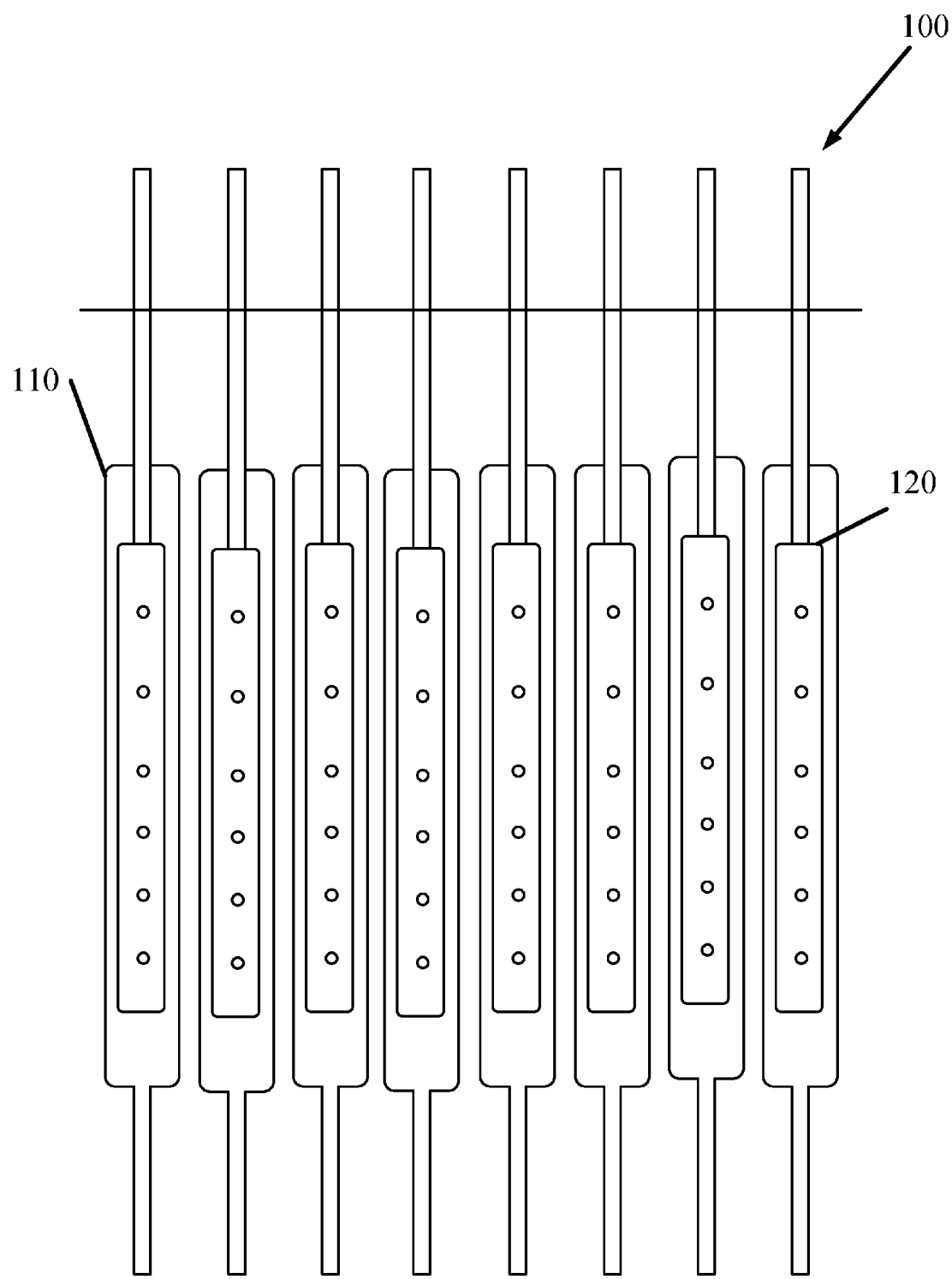
FIG. 1 is a local diagram of a LCD device in the prior art.
Figure 2:
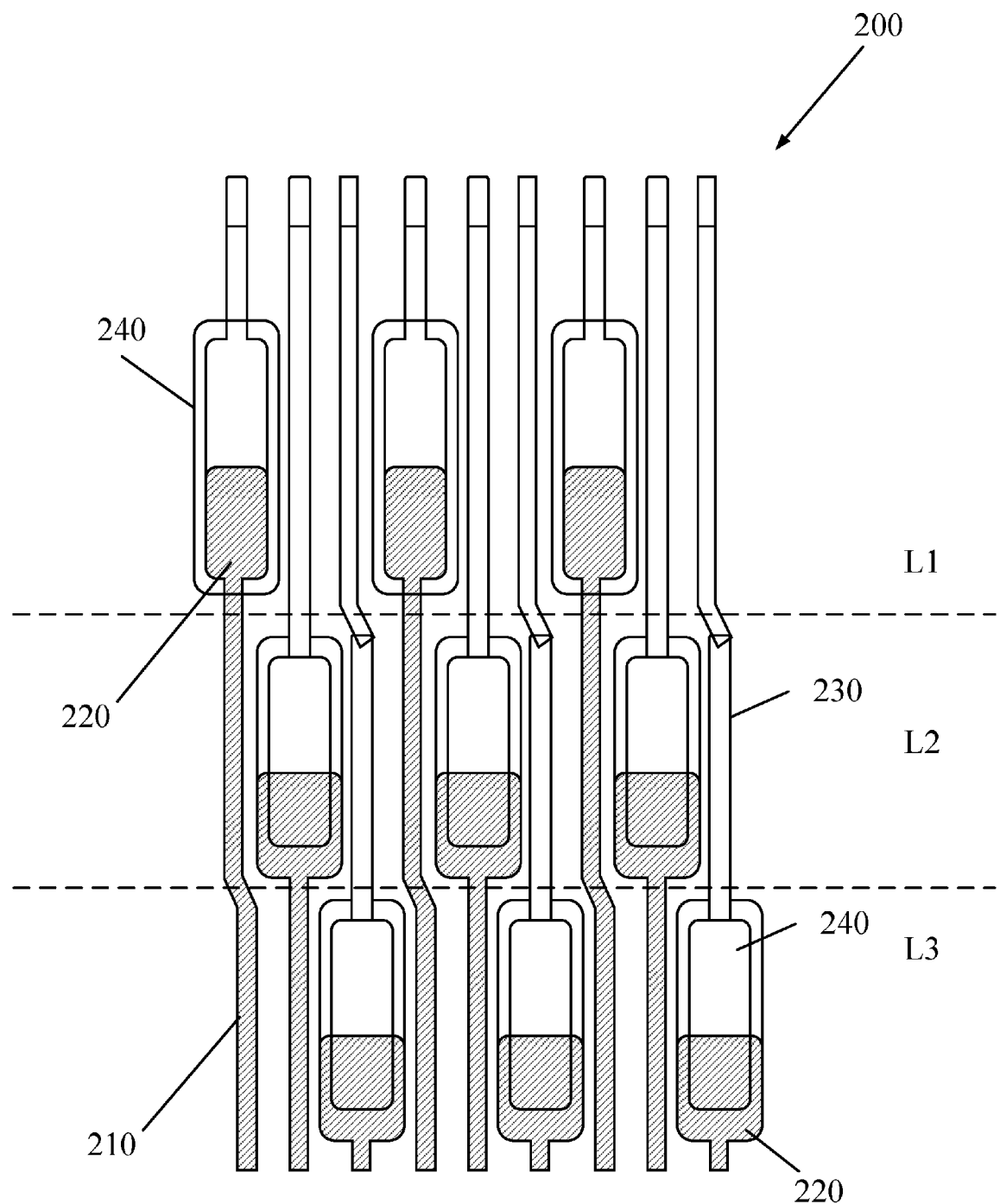
FIG. 2 is a local diagram of a LCD according to the present invention.

Please refer to FIG. 2. FIG. 2 is a local diagram of a LCD 200 according to the present invention. For brevity, FIG. 2 only shows bonding areas of the FPC and LCD panel in the LCD 200.

As shown in FIG. 2, the LCD panel 200 comprises a plurality of metallic wires 210 and a plurality of panel bonding pads 220 each of which is at an end of each metallic wire 210. The metallic wire 210 serves as a data line or a scan line on an LCD panel which is coupled to pixel (not shown) for transmitting signals from external driving chip to drive pixels. Furthermore, the FPC correspondingly has a plurality of metallic wires 230 as well, and there is a FPC bonding pad 240 at the end of each metallic wire 230.

The arrangement of the bonding pad of the LCD 200 in the present invention is different. The panel bonding pad 220/FPC bonding pad 240 is arranged in three sections L1, L2 and L3 (separating by dotted sections). Noted that each panel bonding pad 220/FPC bonding pad 240 is divided into three sections L1, L2, L3. Therefore, such design decreases width of area of whole bonding pads so that there is no need to reduce area of bonding pads or decrease pitch between bonding pads. For instance, the two metallic wires which are coupled between the section L2 and the section L3 substitute for a bonding pad of the section L2 and the section L3 between two adjacent bonding pads of the section L1. In hence, it is able to narrow width of whole bonding pads on account of the width of metallic wires being narrower than that of bonding pads.

In another aspect of the embodiment, each area of the sections L1, L2 and L3 of the panel bonding pad 220 is different. As FIG. 2 shows, an area of the section L1 of the panel bonding pad 220 is smaller than that of the section L2 of the panel bonding pad 220, and an area of the section L2 of the panel bonding pad 220 is approximately equal to that of the section L3 of the panel bonding pad 220. On the other hand, each section L1, L2 and L3 of the FPC bonding pad 240 has corresponding area. In the embodiment, measure of the FPC bonding pad 240 of the section L1 is smaller than that of the FPC bonding pad 240 of the section L2, and measure of the FPC bonding pad 240 of the section L2 is approximately equal to that of the FPC bonding pad 240 of the section L3. In addition, measure of the FPC bonding pad 240 of the section L2 is approximately equal to that of the panel bonding pad 220 of the section L1, and measure of the FPC bonding pad 240 of the section L1 is approximately equal to that of the FPC bonding pad 220 of the section L2.

As FIG. 2 shows, such design is able to make sure that bonding area of the FPC bonding pad 240 and the panel bonding pad 220 in each section L1, L2 and L3 is the same with each other. In hence, the contact resistance is assured.

Figure 3:
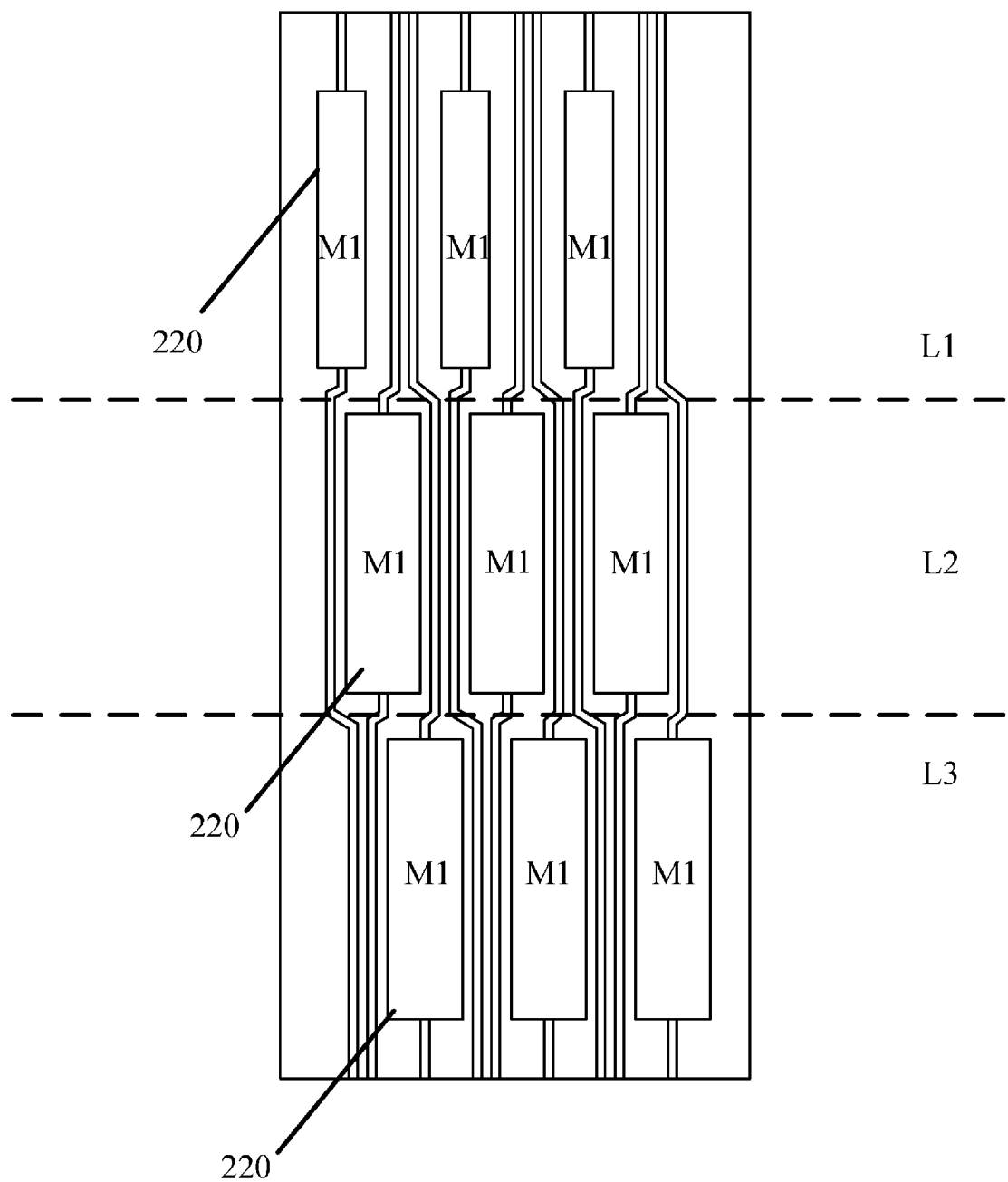
FIG. 3 to FIG. 6 are a manufacture diagram of the panel bonding pad of the LCD according to the present invention.
Figure 5:
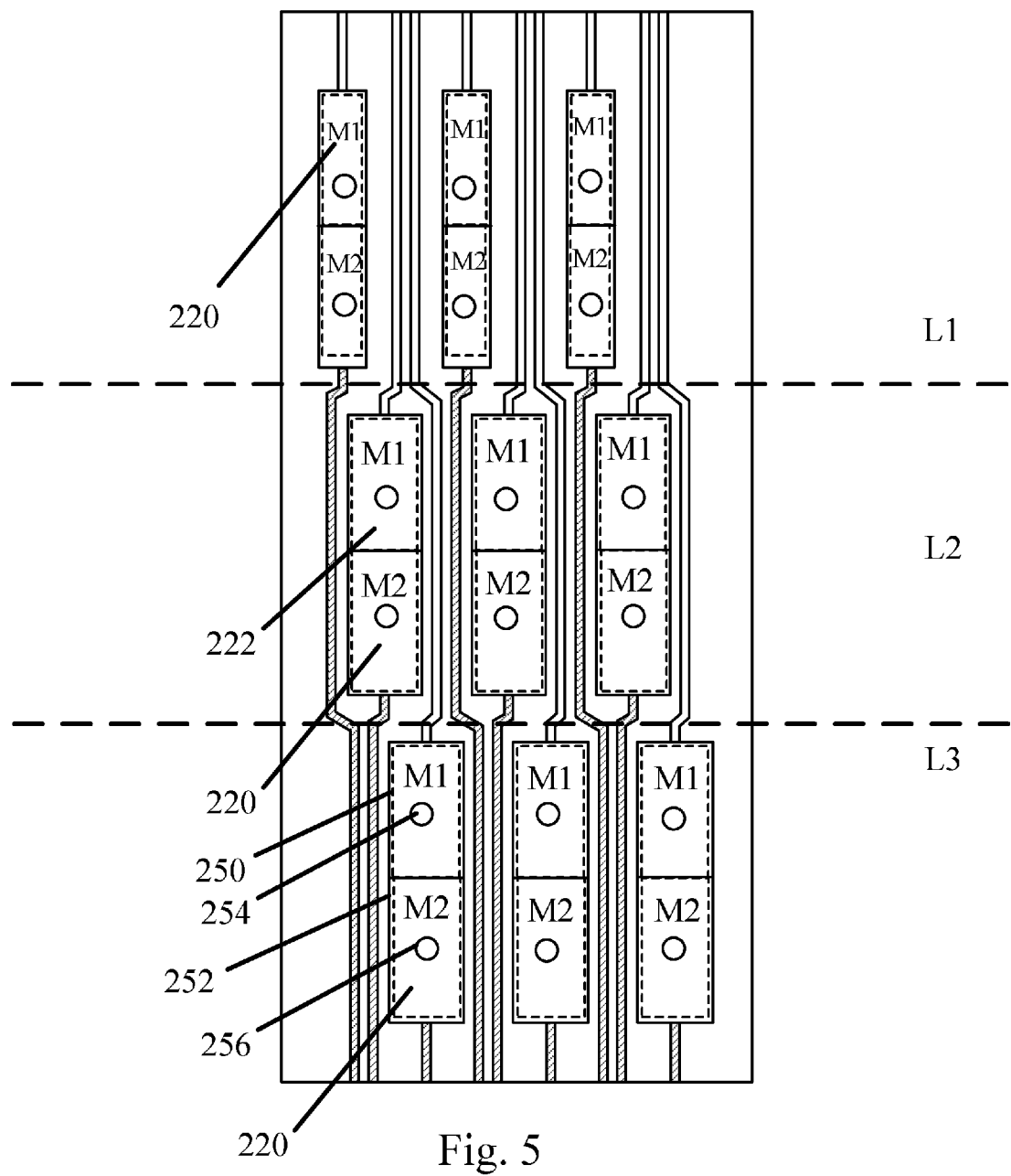
Figure 6:
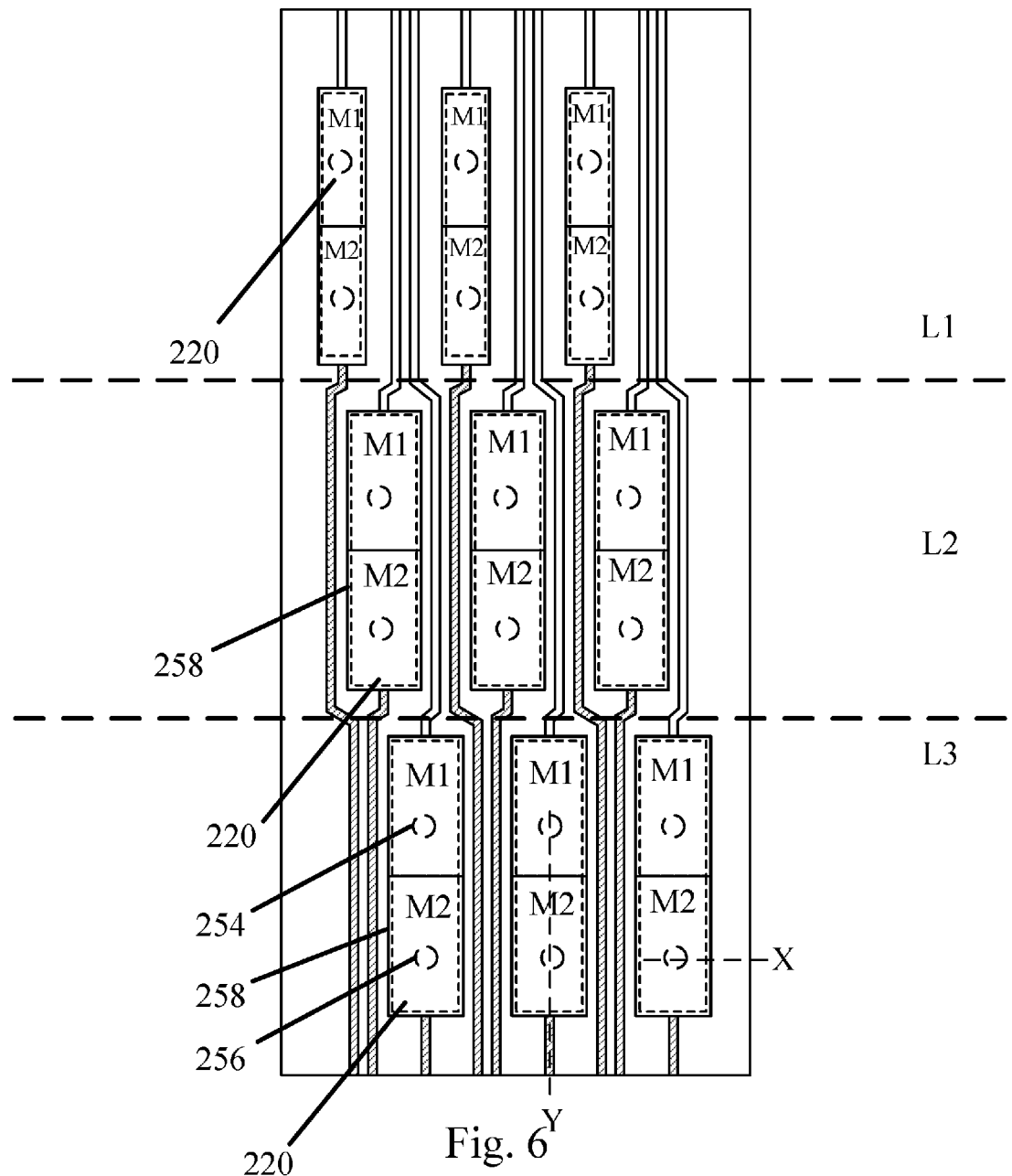
Figure 7:
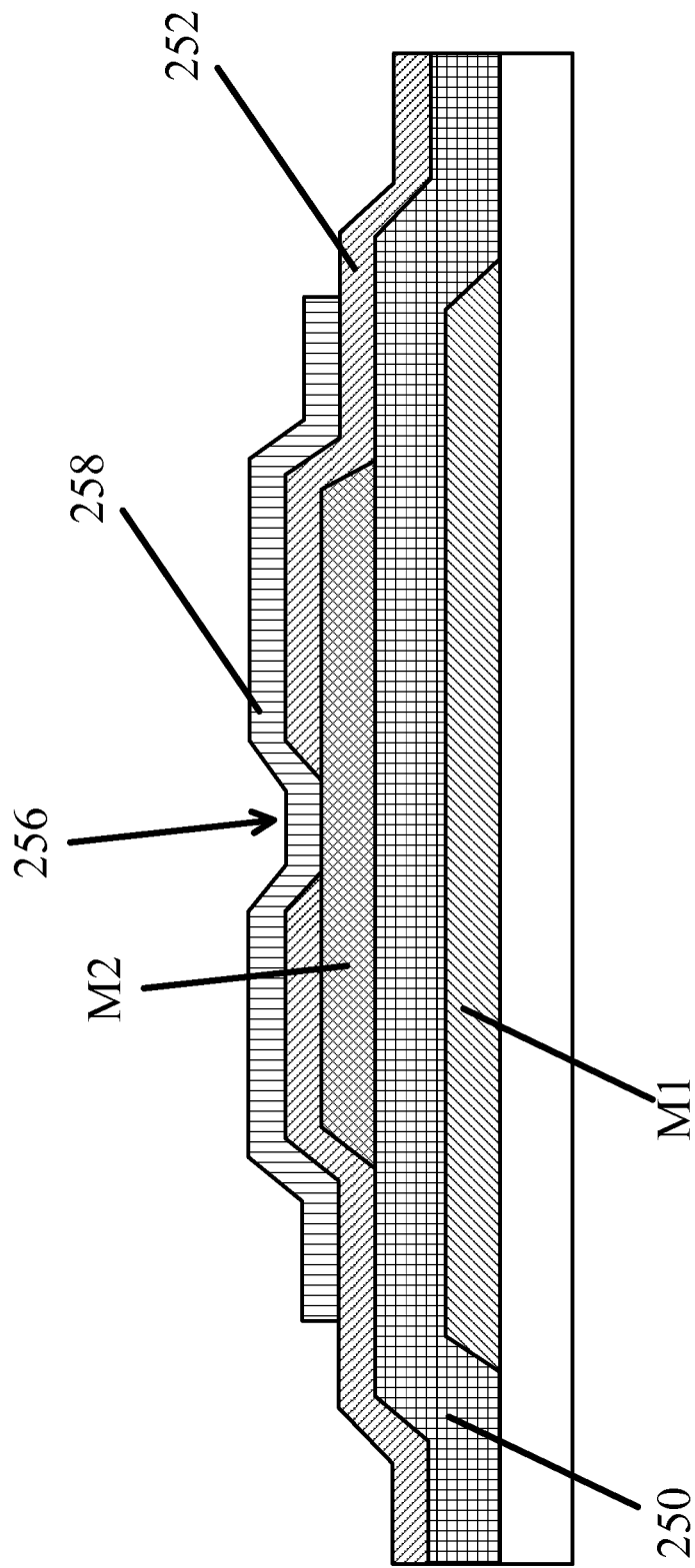
FIG. 7 is a sectional diagram of the panel bonding pad along with the X section in the present invention.
Figure 8:
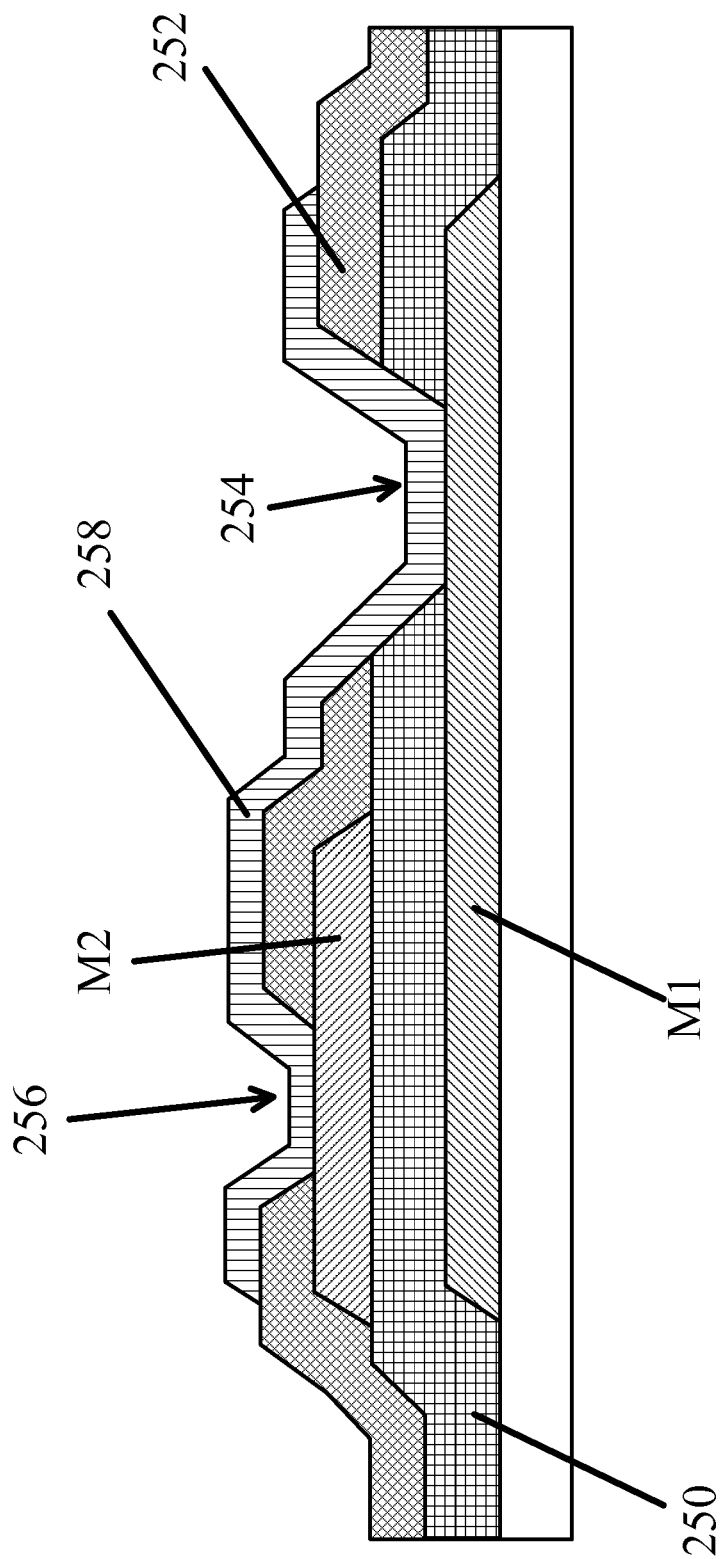
FIG. 8 is a sectional diagram of the panel bonding pad along with the Y section in the present invention.

Please refer to FIG. 3 to FIG. 8. FIG. 3 to FIG. 6 are diagrams of forming the panel bonding pad 220 of the LCD according to the present invention. FIG. 7 is a sectional diagram of the panel bonding pad along with the X section in the present invention. FIG. 8 is a sectional diagram of the panel bonding pad along with the Y section in the present invention. As FIG. 3 shows, taking the first metallic layer M1 the processes, such as lithography etching, to form the structure of the bonding pad 220 in three sections and the metallic wires. Area of the bonding pad 220 in the first section L1 is smaller than that of the bonding pad 220 in the second section L2/the third section L3.

And then, an insulting layer 250 (illustrated in FIG. 7 and FIG. 8) is deposited on the first metallic layer M1.

Figure 4:
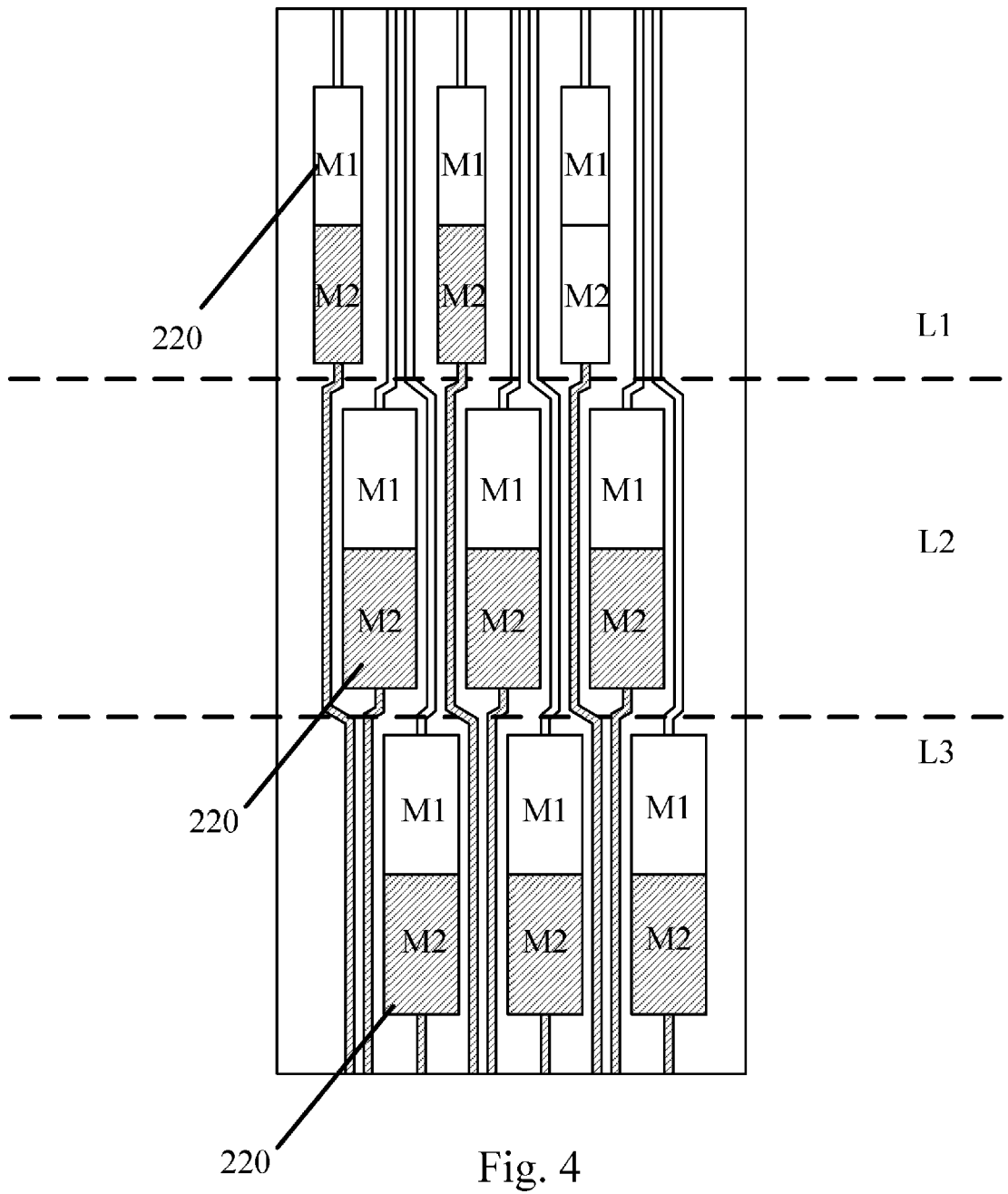

As FIG. 4 shows, the second metallic layer M2 is formed on the first metallic layer M1 by lithography etching to form the structure of fan-out. In other words, each metallic wire coupled to the pixel area form a two-layer structure. The metallic wires at the one end of the bonding pad 220 and not coupled to the panel utilizes the first metallic layer M1, and the second metallic layer M2 just occupies a half of the bonding pad 220. And then, a passivation layer 252 is deposited on the insulating layer 250 (illustrated in FIG. 7 and FIG. 8).

As FIG. 5 shows, the insulating layer 250 on the first metallic layer M1 is etched to form a via 254. Furthermore, a passivation layer 252 over the second metallic layer M2 is etched to form a via 256.

Finally, as FIG. 6 to FIG. 8 show, a transparent conducting layer 258 which covers the passivation layer 252 and the gate insulating 250 is sputtered at the position of the bonding pad 220 for electrically connecting the first metallic layer M1 to the second metallic layer M2 through the via 254, 256 by the transparent conducting layer 258.

Noted that the insulating layer 250 is between the first metallic layer M1 and the second metallic layer M2, and the passivation layer 252 is formed on the second metallic layer M2. However, for clarify, the insulting layer and the passivation layer in FIG. 3 to FIG. 6 are not shown. Therefore, the first metallic layer M1/the second metallic layer M2 be coupled to external driving chips or data lines or scan lines of a LCD panel through the vias 254, 256 which penetrate the passivation layer/insulating layer, respectively.

Please refer to FIG. 7 and FIG. 8. FIG. 7 is a cross section view of the panel bonding pad 220 in a horizontal direction according to the present invention. And FIG. 8 is a section view of the panel bonding pad 220 in a vertical direction according to the present invention.

Please refer to FIG. 7 and FIG. 8 first. The bonding pad 220 comprises a first metallic layer M1, an insulating layer 250, a second metallic layer M2, a passivation layer 252 and an transparent conducting layer 258. The insulating layer 250 is placed between the first metallic layer M1 and the second metallic layer M2, and the passivation layer 252 is on the second metallic layer M2. In addition, the insulating layer 250 and the passivation layer 252 open the via 254 and 256 respectively for laying the transparent conducting layer 258 through the via 254 and 256 to make the first metallic layer M1 and the second metallic layer M2 transmit electrical signals by the connection of the transparent conducting layer 258.

Figure 9:
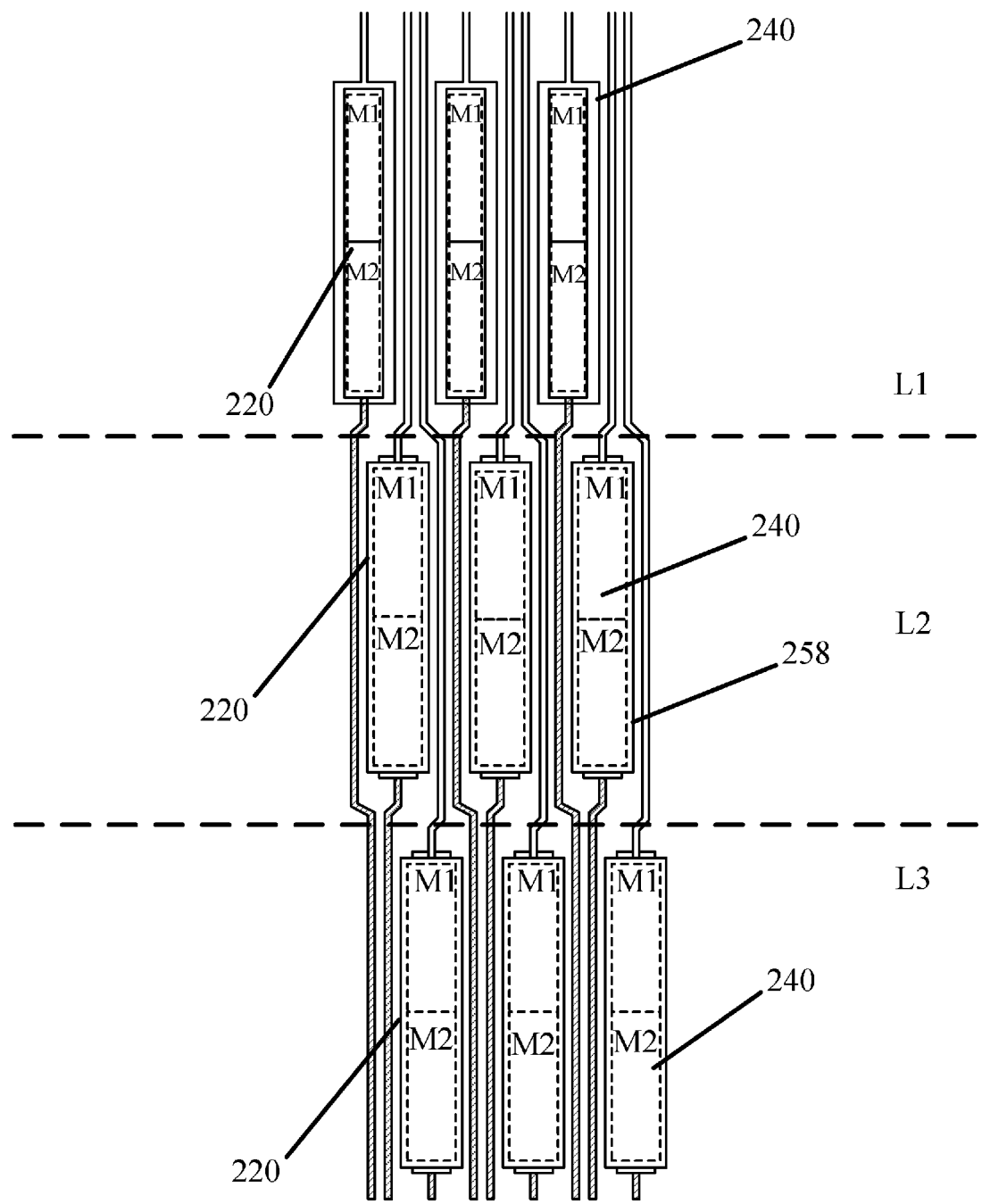
FIG. 9 is a diagram of the panel bonding pad in FIG. 6 bonded with the FPC bonding pad.

Please refer to FIG. 9. FIG. 9 is a diagram of the panel bonding pad 220 in FIG. 6 bonded with the FPC bonding pad 240. As mentioned before, according to proper bonding pad position and measure, the FPC bonding pad 240 in the first section L1 is larger while the panel bonding pad 220 in the first section L1 is smaller, and meanwhile, width of the FPC bonding pad 240 in the first section L1 is equal to that of the panel bonding pad 220 in the second/third section. On the other hand, the FPC bonding pad 240 in the second/third section is smaller but width is equal to the panel bonding pad 220 in the first section, and length of the FPC bonding pad 240 in three sections are the same. Such design assures the bonding area of the FPC bonding pad 240 and the panel bonding pad 220 in each section the same, so that there is equal contact resistance in each section.

Figure 10:
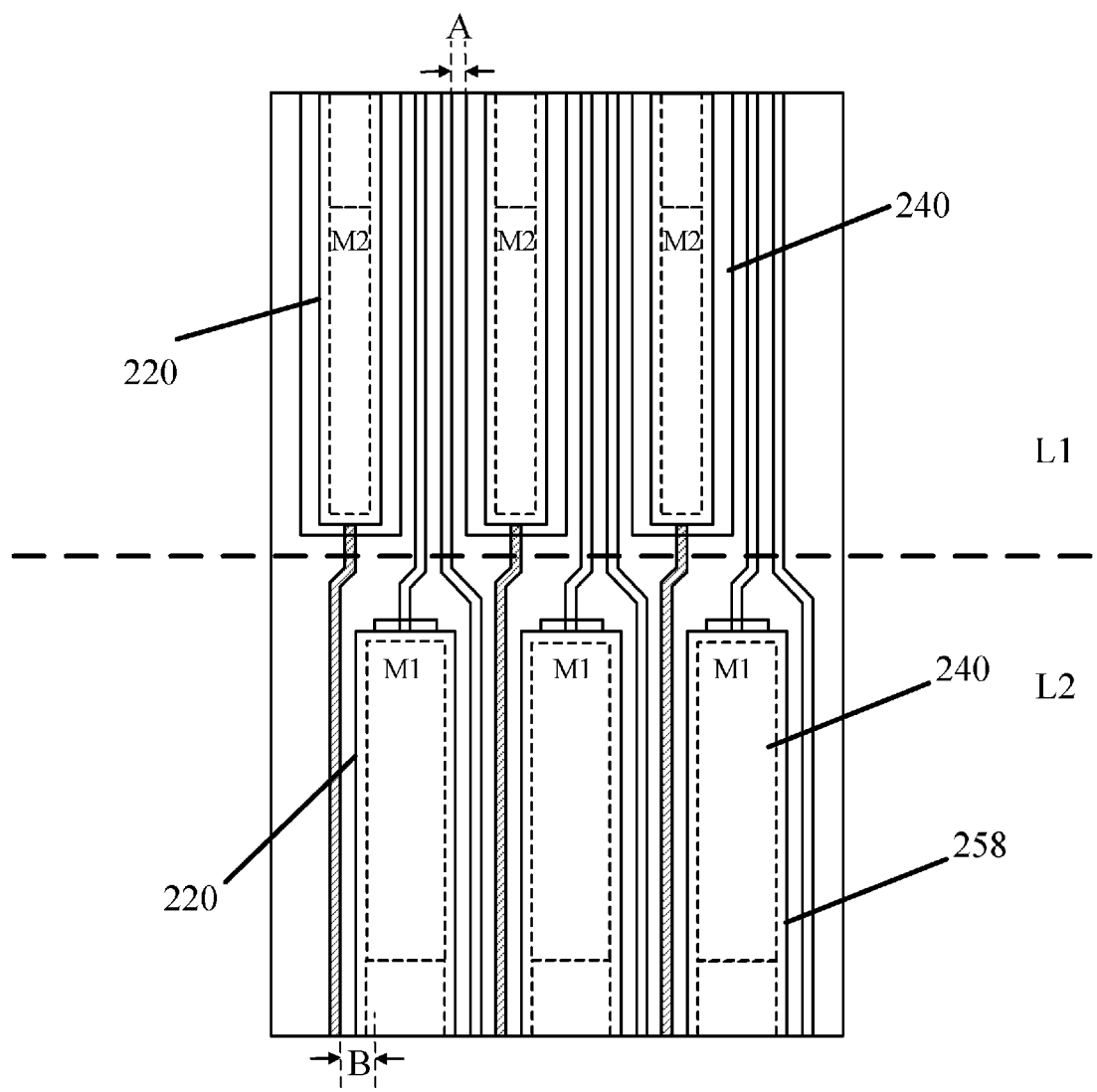
FIG. 10 is a local enlarged diagram of FIG. 9.

Please refer to FIG. 10. FIG. 10 is a local enlarged diagram of FIG. 9. Since different sizes of the bonding pads 220, 240 in three sections L1, L2, and L3, the pitch A between the first section L1 of the FPC bonding pad 240 and the nearby metallic wire is shorter than the pitch B between the second/third sections L2, L3 of the FPC bonding pad 240 and the nearby metallic wire in FIG. 10 Please note that the pitch B is set to be greater than a width complying with accuracy of alignment using a machine. Therefore, even if misalignment occurs, the FPC bonding pad 240 in the second/third section is avoided to be bonded to metallic wires, preventing from signal transmission errors. The pitch A between the FPC bonding pads 240 in the first section L1 is narrower. If an offset, due to misalignment, exceeds the pitch A, the FPC bonding pad 240 may be located over the metallic wires. However, since the metallic wires on bottom of the FPC bonding pad 240 in the first section L1, are made of the first metallic layer M1, and the insulating layer 250 and the passivation layer 252 are between the metallic wires and the FPC bonding pad 240, conductive particles of anisotropic conductive film (ACF) are not capable of penetrating the first metallic layer M1 to cause abnormal signal transmission.

Please take notice that, the bonding pad 220/240 adopts three sections in the embodiments. Practically, the use of four or more sections is also allowed and in the scope of the present invention.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD) device, comprising an LCD panel and a flexible circuit board for linking the LCD panel and an external driving chip, characterize in that: the LCD device further comprises:
   a glass substrate;
   a plurality of first metallic wires formed on the glass substrate;
   a plurality of panel bonding pads, each coupled to one of the plurality of first metallic wires; the plurality of panel bonding pads further comprising:
   a first set of panel bonding pads placed in a first section;
   a second set of panel bonding pads placed in a second section; and
   a third set of panel bonding pads placed in a third section;
   the flexible printed circuit comprising:
   a substrate;
   a plurality of second metallic wires formed on the substrate;
   a plurality of FPC bonding pads, each coupled to one of the plurality of second metallic wires, the plurality of FPC bonding pads comprising:
   a first set of FPC bonding pads placed in a fourth section;
   a second set of FPC bonding pads placed in a fifth section; and
   a third set of FPC bonding pads placed in a sixth section;
   wherein each area of the first set of panel bonding pads is different from that of the second set of panel bonding pads;

wherein the first section corresponds to the fourth section, the second section corresponds to the fifth section, and the third section corresponds to the sixth section when the flexible circuit board couples to the LCD panel, wherein each panel bonding pad comprises:

a first metallic layer, formed on the glass substrate, for coupling to one of the first metallic wires;

an insulating layer, formed on the first metallic layer;

a second metallic layer, formed on the insulating layer;

a passivation layer, formed on the second metallic layer; and a transparent conducting layer, formed on the passivation layer, for electrically connecting to a first metallic layer and a second metallic layer through a via defined on the passivation layer and the insulating layer;

wherein each area of the second set of panel bonding pads is identical with each area of the first set of FPC bonding pads.

2. The LCD device as claimed in claim 1, characterize in that: each area of the first set of panel bonding pads is smaller than that of the second set of panel bonding pads, and each area of the second set of panel bonding pads equals to that of the third set of panel bonding pads.

3. The LCD device as claimed in claim 1, characterize in that: a distance from the pixel area of the LCD panel to the second section is closer than that from the pixel area of the LCD panel to the first section.

4. The LCD device as claimed in claim 1, characterize in that: each area of the first set of FPC bonding pads is greater than that of the second set of FPC bonding pads, and each area of the second set of FPC bonding pads equals to that of the third set of FPC bonding pads.

5. The LCD device as claimed in claim 1, characterize in that: each area of the first set of panel bonding pads is identical with each area of the second set of FPC bonding pads.

6. The LCD device as claimed in claim 1, characterize in that: each area of the plurality of panel bonding pads is identical with each area of the plurality of FPC bonding pads.

* * * * *